United States Patent
Asai et al.

(10) Patent No.: US 10,508,574 B2
(45) Date of Patent: Dec. 17, 2019

(54) INTEGRATED EXHAUST HEAT RECOVERY DEVICE

(71) Applicant: FUTABA INDUSTRIAL CO., LTD., Okazaki-shi, Aichi (JP)

(72) Inventors: Ryuji Asai, Okazaki (JP); Hirohisa Okami, Okazaki (JP)

(73) Assignee: FUTABA INDUSTRIAL CO., LTD., Okazaki-Shi, Aichi (JP)

( * ) Notice: Subject to any disclaimer, the term of this patent is extended or adjusted under 35 U.S.C. 154(b) by 0 days.

(21) Appl. No.: 15/760,935

(22) PCT Filed: Jan. 22, 2016

(86) PCT No.: PCT/JP2016/051920
§ 371 (c)(1),
(2) Date: Mar. 16, 2018

(87) PCT Pub. No.: WO2017/126124
PCT Pub. Date: Jul. 27, 2017

(65) Prior Publication Data
US 2018/0258808 A1 Sep. 13, 2018

(51) Int. Cl.
*F01N 3/02* (2006.01)
*F01N 3/24* (2006.01)
(Continued)

(52) U.S. Cl.
CPC ............ *F01N 3/0205* (2013.01); *F01N 3/20* (2013.01); *F01N 3/24* (2013.01); *F01N 3/2889* (2013.01);
(Continued)

(58) Field of Classification Search
CPC ...... F01N 2240/02; F01N 3/0205; F01N 3/20; F01N 3/2066; F01N 3/24; F01N 3/2889; F01N 5/02; Y02T 10/16; Y02T 10/20
See application file for complete search history.

(56) References Cited

U.S. PATENT DOCUMENTS 7,150,147 B2 * 12/2006 Murata ................. F01N 3/2053
60/287

FOREIGN PATENT DOCUMENTS

JP    H0579791 A    3/1993
JP    2006250524 A    9/2006
(Continued)

OTHER PUBLICATIONS

International Search Report for International Patent Application No. PCT/JP2016/051920 (Form PCT/ISA/210), dated Apr. 26, 2016 (2 pages).
(Continued)

*Primary Examiner* — Phutthiwat Wongwian
*Assistant Examiner* — Diem T Tran
(74) *Attorney, Agent, or Firm* — Withrow & Terranova, P.L.L.C.; Vincent K. Gustafson

(57) ABSTRACT

An integrated exhaust heat recovery device positioned in an exhaust gas channel includes: a positioning section that comprises a tubular section extending in a downward-flow direction of exhaust gas, and has an exhaust gas purification device positioned therein; a heat exchange section positioned on a downstream side of the positioning section and having a heat exchanger; and an exhaust gas control unit for introducing exhaust gas, which flows from the positioning section, to the heat exchange section. The heat exchanger includes: a plurality of plates positioned so as to overlap in the downward-flow direction; an intake section for causing fluid to flow into heat exchange channels inside the plurality of plates from an intake port that opens laterally; and a discharge section for causing fluid to exit from the heat exchange channels through a discharge port that opens laterally.

15 Claims, 2 Drawing Sheets

(51) Int. Cl.
*F01N 5/02* (2006.01)
*F01N 3/20* (2006.01)
*F01N 3/28* (2006.01)

(52) U.S. Cl.
CPC .............. *F01N 5/02* (2013.01); *F01N 3/2066* (2013.01); *F01N 2240/02* (2013.01); *Y02T 10/16* (2013.01); *Y02T 10/20* (2013.01)

(56) References Cited

FOREIGN PATENT DOCUMENTS

| JP | 2008-163773 | * | 7/2008 |
| JP | 2008163773 A | | 7/2008 |
| JP | 2010024907 A | | 2/2010 |
| JP | 2015-137616 | * | 7/2015 |
| JP | 2015137616 A | | 7/2015 |

OTHER PUBLICATIONS

Notification of Reasons for Refusal for Japanese Patent Application No. 2017-562414 dated Sep. 4, 2018 (9 pages including English machine translation).

Notification of Transmittal of Translation of the International Preliminary Report on Patentability, and International Preliminary Report on Patentability (Chapter I of Patent Cooperation Treaty) for International Application No. PCT/JP2016/051920 (Forms PCT/IB/338, PCT/IB/373, and PCT/ISA/237), dated Aug. 2, 2018 (10 pages).

First Notification of Office Action for Chinese Patent Application No. 201680054749.1, dated Jul. 3, 2019, 14 pages including English translation.

* cited by examiner

INTEGRATED EXHAUST HEAT RECOVERY DEVICE

CROSS-REFERENCE TO RELATED APPLICATON(S)

This application is a 35 U.S.C. § 371 national phase filing of International Application No. PCT/JP2016/051920 filed Jan. 22, 2016, wherein the disclosure of the foregoing application is hereby incorporated by reference herein in its entirety.

TECHNICAL FIELD

The present disclosure relates to an integrated exhaust heat recovery device that enables integration of a purification device, which purifies exhaust gas such as from an engine of a vehicle, and an exhaust heat recovery device, which recovers heat of exhaust gas.

BACKGROUND ART

A known exhaust heat recovery device exchanges heat so as to transmit heat of exhaust gas from an engine of a vehicle to cooling water or the like. Here, when a new exhaust heat recovery device is mounted on a vehicle which has not been provided with an exhaust heat recovery device, it is difficult to ensure an installation space for the exhaust heat recovery device. For this reason, downsizing of the exhaust heat recovery device is desired. However, even in a case as such, the exhaust heat recovery device is required to exchange heat with high efficiency for improved fuel economy. In response to this, Patent Document 1 describes integrally providing a heat exchanger, which exchanges heat between exhaust gas and cooling water, in an exhaust manifold.

PRIOR ART DOCUMENTS

Patent Documents

Patent Document 1: Japanese Unexamined Patent Application Publication No. 2008-163773

SUMMARY OF THE INVENTION

Problems to be Solved by the Invention

In the heat exchanger of Patent Document 1, however, cooling water simply flows in and out from a side surface of the heat exchanger. That is, flow of the cooling water is not appropriately controlled in the heat exchanger. Thus, it is possible that the flow of the cooling water may become unbalanced inside the heat exchanger. As a result, efficiency of heat exchange may be reduced.

In one aspect of the present disclosure, it is desirable to facilitate positioning of the exhaust heat recovery device and the like while improving efficiency of heat exchange.

Means for Solving the Problems

An integrated exhaust heat recovery device according to an embodiment of the present disclosure is positioned in an exhaust gas channel that is a channel of exhaust gas from an engine. The integrated exhaust heat recovery device comprises a positioning section, a heat exchange section, and an exhaust gas control unit. The positioning section comprises a tubular section extending in a downward-flow direction toward a downstream side of the exhaust gas channel, and has a purification device, which purifies the exhaust gas, positioned therein. The heat exchange section has a heat exchanger for transmitting heat of the exhaust gas to a fluid, and is positioned on the downstream side of the positioning section. The exhaust gas control unit introduces the exhaust gas, which flows from the positioning section, to the heat exchange section.

The heat exchanger comprises a plurality of plates, an intake section, and a discharge section. The plurality of plates comprise flat sections positioned so as to overlap in the downward-flow direction and have fluid channels, as the heat exchange channels, inside thereof. The intake section couples one ends of the heat exchange channels of the plurality of plates, and causes the fluid, which flows in through an intake port that opens laterally in the downward-flow direction, to flow into the heat exchange channels. The discharge section couples the other ends of the heat exchange channels of the plurality of plates, and causes the fluid that flows down through the heat exchange channels to exit through a discharge port that opens laterally in the downward-flow direction.

According to the configuration as above, heat is exchanged so as to transmit the heat of the exhaust gas to the fluid by the plurality of plates positioned so as to overlap in the downward-flow direction. At one ends of the heat exchange channels inside the plurality of plates, fluid flows in from the same intake port. Further, the fluid that has reached the other ends of the heat exchange channels flows out from the same discharge port. The intake port and the discharge port are open laterally in the downward-flow direction. Therefore, it is possible to reduce variations in a distance between each heat exchange channel and the intake port, and variations in a distance between each heat exchange channel and the discharge port. Therefore, flow of the fluid in each heat exchange channel can be more uniform.

In addition, the above configuration integrates the exhaust heat recovery device, which exchanges heat between the exhaust gas and the fluid, and the exhaust gas purification device. Therefore, it is possible to reduce an installation space of the exhaust heat recovery device and the like. Furthermore, a length in the downward-flow direction of the integrated exhaust heat recovery device can be reduced, as compared to a case in which the intake port and the discharge port to each plate are open in the downward-flow direction. As a result, it becomes possible to more flexibly determine an installation position of the integrated exhaust heat recovery device.

Therefore, it is possible to facilitate positioning of the exhaust heat recovery device and the like while improving efficiency of heat exchange.

In the integrated exhaust heat recovery device according to an embodiment of the present disclosure, the exhaust gas control unit may comprise a coupling section, a reduced section, and a guide section. The coupling section may comprise a tubular section extending in the downward-flow direction from an end on the downstream side of the positioning section. The reduced section may comprise a tubular section extending in the downward-flow direction from an end on the downstream side of the coupling section, and may be thinner than the coupling section. The guide section may guide the exhaust gas to the heat exchange section. The heat exchange section may be positioned laterally in the reduced section. The guide section may cause the exhaust gas, which flows into the reduced section, to flow out laterally in the reduced section, so as to guide the exhaust gas to the heat exchange section.

The exhaust gas, which has passed through the purification device, has nonuniform flow velocity and course. On the other hand, according to the above configuration, the channel of the exhaust gas, which has passed through the purification device, is narrowed in the reduced section. Therefore, the flow velocity of the exhaust gas flowing down through the reduced section is increased. At this time, the flow velocity and the course of the exhaust gas become more uniform. Also, by causing exhaust gas to flow out laterally in a collecting section, the exhaust gas is guided to the heat exchange section. Therefore, the flow velocity of the exhaust gas, which flows toward the heat exchange section, and the flow velocity of the exhaust gas, which flows down through the heat exchange section, are increased. As a result, temperature of the exhaust gas in the heat exchange section is maintained at a higher temperature. Efficiency of heat exchange is improved.

In the integrated exhaust heat recovery device according to an embodiment of the present disclosure, the reduced section may have an intake port located on the downstream side of a section where the heat exchange section is positioned laterally. The guide section may close a guiding position located on the downstream side of the intake port of the reduced section, move the exhaust gas, which has reached the guiding position, toward an opposite side in the downward-flow direction, and further cause the exhaust gas to flow out laterally in the reduced section from the intake port, so as to guide the exhaust gas to the heat exchange section.

According to the configuration as above, the course of the exhaust gas, which flows down through the reduced section at a high speed, is reversed and flows out from the intake port laterally in the reduced section. As a result, the exhaust gas is guided to the heat exchange section. Therefore, the flow velocity of the exhaust gas, which flows toward the heat exchange section, and the flow velocity of the exhaust gas, which flows down through the heat exchange section, are further increased. As a result, the temperature of the exhaust gas in the heat exchange section is maintained at a higher temperature. Efficiency of heat exchange is further improved.

In the integrated exhaust heat recovery device according to an embodiment of the present disclosure, the guide section may comprise a valve that opens and closes at the guiding position, and may guide the exhaust gas to the heat exchange section by closing the valve at the guiding position.

The configuration as above enables switching of whether to exchange heat between the exhaust gas and the fluid. Also, the intake port coupled to the heat exchange section is provided on a side surface of the reduced section. Therefore, when the guiding position is opened, it is difficult for the exhaust gas to move toward the heat exchange section. Thus, it is possible to suppress more than necessary heat exchange.

In the integrated exhaust heat recovery device according to an embodiment of the present disclosure, the plates may be positioned so as to overlap in the downward-flow direction while surrounding the reduced section laterally.

With the above configuration, it is possible to effectively utilize a lateral space to the reduced section that is thinner than the coupling section. Therefore, compact housing of the heat exchange section and the like can be achieved. It is possible to downsize the integrated exhaust heat recovery device.

EXPLANATION OF REFERENCE NUMERALS

1 . . . integrated exhaust heat recovery device, 2 . . . upstream exhaust pipe, 20 . . . positioning section, 21 . . . purification device, 3 . . . downstream exhaust pipe, 30 . . . coupling section, 31 . . . collecting section, 4 . . . heat exchange chamber, 40 . . . heat exchanger, 41 . . . coupling member, 41$a$ . . . coupling surface, 41$b$ . . . opening, 42 . . . plate, 42$a$ . . . heat exchange channel, 5 . . . partition member, 50 . . . tubular section, 51 . . . partition section, 52 . . . inflow channel 52$a$ . . . intake port, 53 . . . discharge port, 55 . . . opening, 6 . . . valve device, 60 . . . valve body, 7 . . . shell member, 100 . . . exhaust gas, 110 . . . cooling liquid.

MODE FOR CARRYING OUT THE INVENTION

Hereinafter, an embodiment of the present disclosure will be described with reference to the drawings. The present disclosure is not limited to the following embodiment and can take various forms within the technical scope of the present disclosure.

[Description of Overall Configuration]

Figure 1:
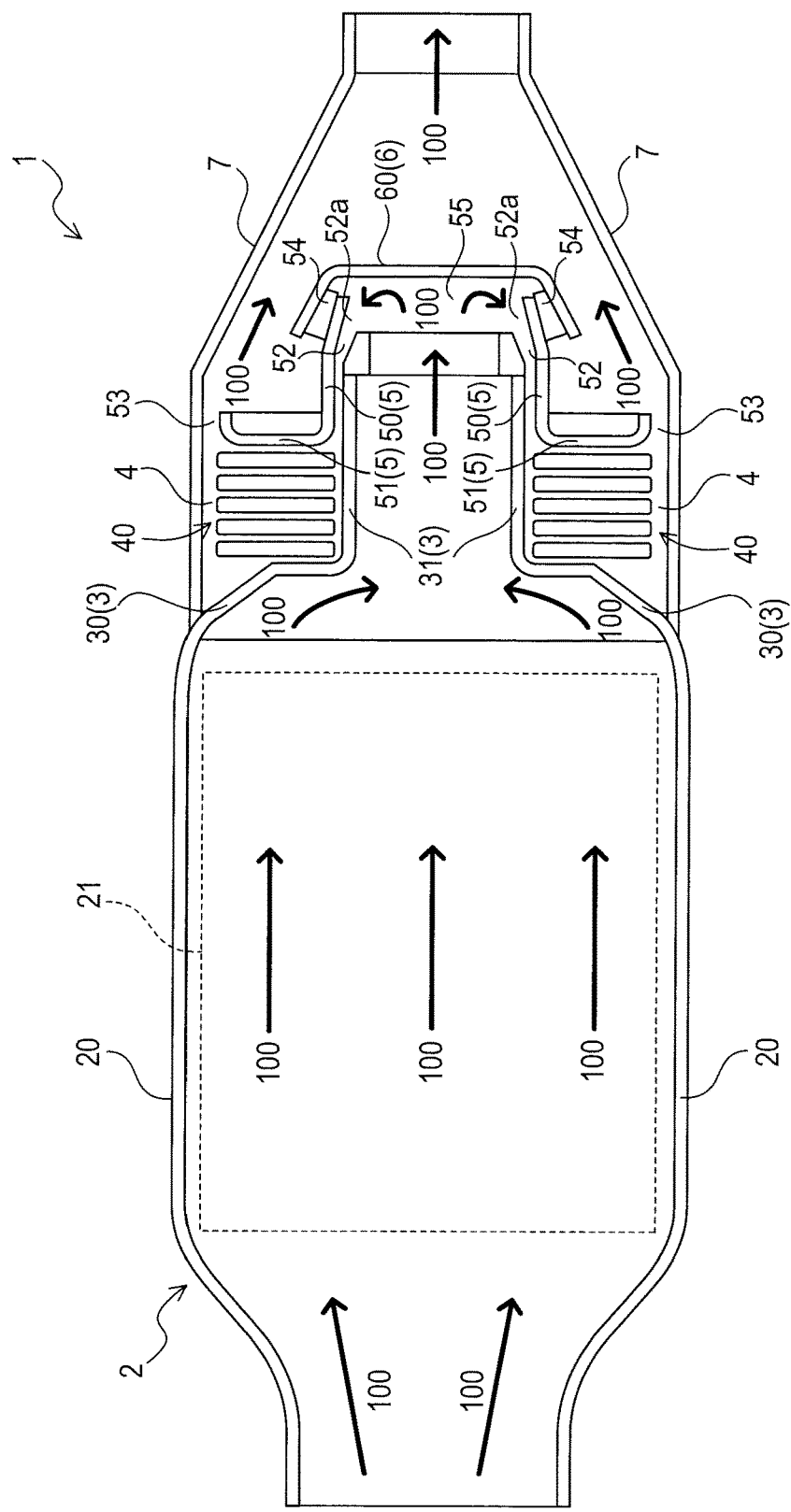
FIG. 1 is a lateral cross-sectional view of an upstream exhaust pipe, a downstream exhaust pipe, a heat exchange chamber, a heat exchanger, a valve device in a closed state, a shell member, etc. of an integrated exhaust heat recovery device of the present embodiment.

An integrated exhaust heat recovery device 1 of the present embodiment is mounted on a movable body such as a vehicle having an engine (FIG. 1). The integrated exhaust heat recovery device 1 is formed by integrating a purification device that purifies exhaust gas of an engine or the like and an exhaust heat recovery device that recovers heat of exhaust gas. The integrated exhaust heat recovery device 1 is disposed in an exhaust gas channel which is a channel of exhaust gas of an engine or the like. In other words, the integrated exhaust heat recovery device 1 has a part of the exhaust gas channel inside thereof. Hereinafter, an upstream side of the exhaust gas channel is simply referred to as the upstream side, and a downstream side of the exhaust gas channel is simply referred to as the downstream side.

In the integrated exhaust heat recovery device 1, heat is exchanged between exhaust gas 100, which is a high temperature fluid, and a cooling liquid of an engine. That is, heat of the exhaust gas 100 is transmitted to the cooling liquid of the engine. As a result, heat is recovered from the exhaust gas 100. The cooling liquid may be, for example, cooling water or oil liquid.

Further, the integrated exhaust heat recovery device 1 has a purification device 21. The purification device 21 purifies the exhaust gas 100. The purification device 21 may be, for example, a catalyst, a filter or the like which has a columnar outer shape. Such catalyst or the like has many channels for the exhaust gas 100 extending in a height direction inside thereof. The catalyst oxidizes or reduces the exhaust gas 100. As a result, the exhaust gas 100 is purified. Specifically, the catalyst may be, for example, an oxidation catalyst. The oxidation catalyst oxidizes substances such as nitrogen monoxide (NO), carbon monoxide (CO), or hydrocarbon (HC) contained, for example, in the exhaust gas 100 from a diesel engine. Further, the catalyst may be, for example, an SCR catalyst (Selective Catalytic Reduction). The SCR catalyst reduces NOx contained, for example, in the exhaust gas 100 from the diesel engine. Further, the filter may, for example, supplement and burn PM (particulate matter) in the exhaust gas 100.

Further, the integrated exhaust heat recovery device 1 comprises an upstream exhaust pipe 2, a downstream exhaust pipe 3, a heat exchange chamber 4, a partition member 5, a valve device 6, a shell member 7, and the like.

The upstream exhaust pipe 2 is a cylindrical member with open ends. The upstream exhaust pipe 2 extends in a downward-flow direction. The downward-flow direction is a direction toward the downstream side of the exhaust gas channel. A space inside the upstream exhaust pipe 2 serves as a channel of the exhaust gas 100. An opening (hereinafter referred to as an inlet) on the upstream side of the upstream exhaust pipe 2 is coupled to an exhaust manifold or the like. The exhaust manifold is a member into which the exhaust gas from the engine flows. The upstream exhaust pipe 2 has a positioning section 20. The positioning section 20 is a section extending from a position spaced a specified distance from the inlet of the upstream exhaust pipe 2 toward an opening (hereinafter, an outlet) on the downstream side. The positioning section 20 has a larger diameter than a periphery of the inlet of the upstream exhaust pipe 2. The purification device 21 is positioned in the positioning section 20.

The shell member 7 is a cylinder-like member with open ends. The shell member 7 extends in the downward-flow direction. A space inside the shell member 7 serves as a channel of the exhaust gas 100 on the downstream side of the upstream exhaust pipe 2. The downstream exhaust pipe 3, the heat exchange chamber 4, the partition member 5, the valve device 6, and the like are positioned in the space inside the shell member 7.

The downstream exhaust pipe 3 is a cylinder-like section with open ends. The downstream exhaust pipe 3 extends in the downward-flow direction. A space inside the downstream exhaust pipe 3 serves as a channel of the exhaust gas 100. An opening (hereinafter referred to as an inlet) on the upstream side of the downstream exhaust pipe 3 is coupled to the outlet of the upstream exhaust pipe 2 (in other words, the end on the downstream side of the positioning section 20). The inlet of the downstream exhaust pipe 3 faces the purification device 21 positioned in the positioning section 20.

Further, the downstream exhaust pipe 3 comprises two sections, that is, a coupling section 30 and a collecting section 31. The coupling section 30 extends from the inlet of the downstream exhaust pipe 3. A diameter of the coupling section 30 decreases toward the downstream side. In other words, the coupling section 30 is tapered toward the downstream side. The coupling section 30 couples the positioning section 20 and the collecting section 31. The collecting section 31 extends in the downward-flow direction from an end on the downstream side of the coupling section 30. A diameter of the collecting section 31 is substantially constant. Further, the collecting section 31 is thinner than the positioning section 20.

The heat exchange chamber 4 is an annular space surrounding the collecting section 31 laterally. The heat exchange chamber 4 is located on the downstream side of the upstream exhaust pipe 2 (in other words, the positioning section 20). The heat exchange chamber 4 is a space surrounded by the coupling section 30, the collecting section 31, the shell member 7, a partition section 51 of the partition member 5 (details will be described later), and the like. A heat exchanger 40 to be described later is positioned in the heat exchange chamber 4. Heat of the exhaust gas 100 is transmitted to the cooling liquid by the heat exchanger 40.

The partition member 5 has a tubular section 50, a partition section 51, and the like.

The tubular section 50 is a cylindrical section. The tubular section 50 covers a section around an opening (hereinafter, outlet) on the downstream side of the collecting section 31 laterally. Further, the tubular section 50 covers a space on the downstream side of the outlet of the collecting section 31 laterally. The tubular section 50 is positioned with a gap between the tubular section 50 and a side surface of the collecting section 31. This gap serves as an inflow channel 52 to the heat exchange chamber 4. An intake port 52a which is an inlet of the inflow channel 52 is located between an edge surrounding the outlet of the collecting section 31 and an inner side of the side surface of the tubular section 50. The inflow channel 52 is positioned so as to surround the outlet of the downstream exhaust pipe 3 and a side surface around the outlet of the downstream exhaust pipe 3. The intake port 52a is positioned so as to surround the outlet of the downstream exhaust pipe 3. An opening (hereinafter, the outlet 55) on the downstream side of the tubular section 50 is opened and closed by a valve body 60 of the valve device 6. A buffer member 54 is positioned around the outlet 55 of the tubular section 50. The buffer member 54 surrounds a periphery of the outlet 55. The buffer member 54 reduces impact caused when the valve body 60 closes the outlet 55. The buffer member 54 may be a wire mesh, for example. The wire mesh is a member produced by weaving a wire-like member made of metal such as stainless steel.

The partition section 51 is a flange-like section located at an end on the upstream side of the tubular section 50. In other words, the partition section 51 is a plate-shaped section protruding laterally from an outer edge of the opening on the upstream side of the tubular section 50. The partition section 51 is an annular section surrounding a periphery of the opening on the upstream side of the tubular section 50. The partition section 51 covers an end on the downstream side of the heat exchange chamber 4. The partition section 51 is positioned with a gap between an edge forming an outer periphery of the partition section 51 and an inner side of a side surface of the shell member 7. This gap serves as a discharge port 53 of the exhaust gas 100 from the heat exchange chamber 4. The discharge port 53 is positioned along the inner side of the side surface of the shell member 7 so as to surround the collecting section 31 and the partition member 5 and the like.

The valve device 6 opens and closes the outlet 55 of the tubular section 50 by the valve body 60. The valve body 60 is operated by a spring and an actuator (not shown) or the like. When the outlet 55 of the tubular section 50 is closed by the valve device 6, the exhaust gas 100, which reaches the outlet 55, collides with the valve body 60 and moves to an opposite side in the downward-flow direction. Then, the exhaust gas 100 flows into the inflow channel 52 to the heat exchange chamber 4. At this time, the exhaust gas 100 flows from inside of the collecting section 31 and the tubular section 50 into the inflow channel 52 while spreading in a radial direction. Then, the exhaust gas 100 flows down through the inflow channel 52 toward the opposite side in the downward-flow direction. Thereafter, the exhaust gas 100 passes through the inflow channel 52 and flows into the heat exchange chamber 4. In the heat exchange chamber 4, the exhaust gas 100 contacts the plates 42 of the heat exchanger 40. As a result, heat of the exhaust gas 100 is transmitted to the cooling liquid. Thereafter, the exhaust gas 100 flows out of the heat exchange chamber 4 from the discharge port 53.

The exhaust gas 100 flows down toward the downstream side, and flows outside through an opening (hereinafter, an outlet) on the downstream side of the shell member 7.

When the outlet 55 is opened by the valve device 6, the exhaust gas 100 reaching the end on the downstream side of the tubular section 50, passes through the outlet 55. Thereafter, the exhaust gas 100 flows out from the outlet of the shell member 7.

The outlet 55 of the tubular section 50 may be closed at all times without the valve device 6. As a result, the exhaust gas 100 is always guided to the heat exchange chamber 4.

[Description on Configuration of Heat Exchanger]

Figure 2A:
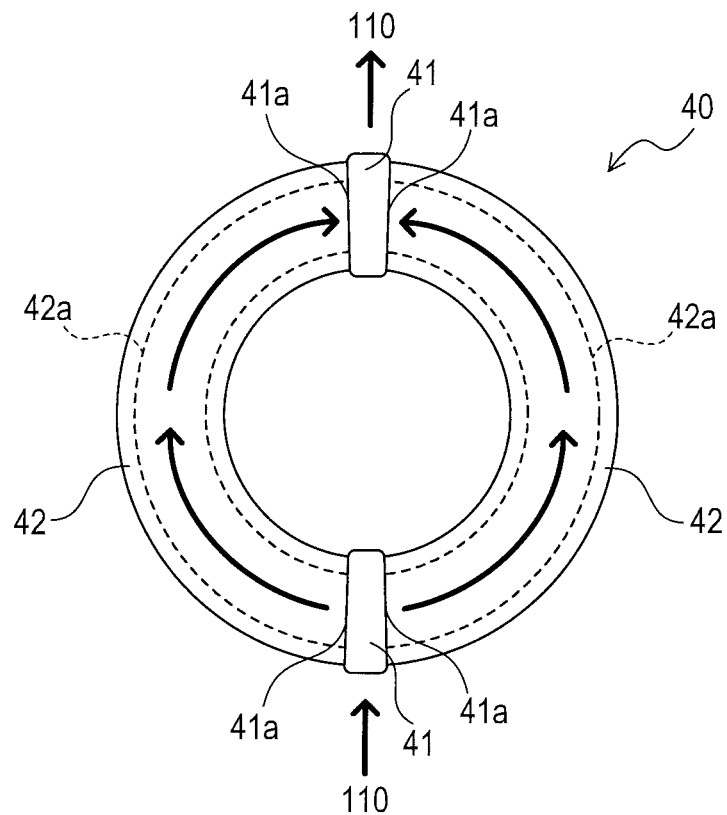
FIG. 2A is a front view of the heat exchanger of the present embodiment.
Figure 2B:
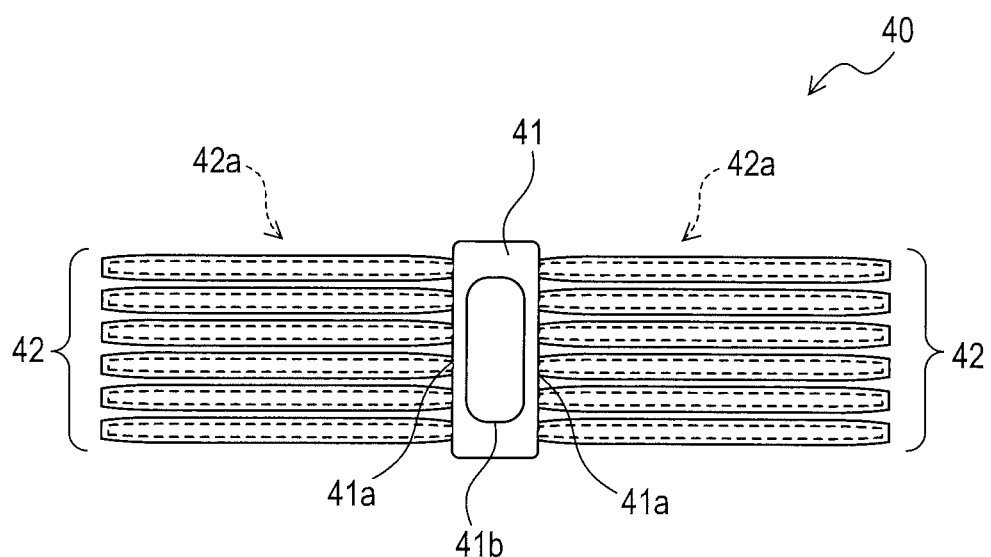
FIG. 2B is a side view of the heat exchanger of the present embodiment.

Next, the heat exchanger 40 will be described (FIGS. 2A and 2B). The heat exchanger 40 comprises two coupling members 41 and a plurality of plates 42 and the like.

The plurality of plates 42 are the same members. Hereinafter, description will be given focusing on one of the plurality of plates 42. The plate 42 is a band-like member. In other words, the plate 42 is a flat elongated member having an approximately constant width. The plate 42 is curved in a width direction and has a semicircular arc shape. The plate 42 has a heat exchange channel 42a therein which is a space through which a cooling liquid 110 flows down. The heat exchange channel 42a extends from one end to the other end of the plate 42. An opening coupled to the heat exchange channel 42a is provided at both ends of the plate 42.

The coupling member 41 is an elongated substantially rectangular parallelepiped section. The coupling member 41 comprises an opening 41b and two coupling surfaces 41a. The opening 41b is provided in one of outer surfaces (longitudinal outer surfaces) extending in a longitudinal direction of the coupling member 41. The opening 41b has an elongated shape extending in the longitudinal direction of the coupling member 41. The coupling surfaces 41a are two longitudinal outer surfaces that face each other across the longitudinal outer surface provided with the opening 41b.

Each of the coupling surfaces 41a comprises N coupling ports (N is an integer of 2 or more) for coupling the plates 42. In the present embodiment, N=5, as an example. These coupling ports are positioned at regular intervals. These coupling ports are aligned along the longitudinal direction of the coupling member 41. In other words, these coupling ports are disposed along the opening 41b. An end of one plate 42 can be coupled to one coupling port. Depression of the end of the plate 42 toward the coupling port couples the coupling port and the end of the plate 42.

Further, the coupling member 41 has a channel for the cooling liquid 110 therein. The channel extends in the longitudinal direction of the coupling member 41. The coupling port and the opening 41b are coupled to the channel.

The ends of the plates 42 are coupled to the N coupling ports of the respective coupling surfaces 41a of each coupling member 41. At this time, the N plates 42 coupled to the coupling ports of the respective coupling surfaces 41a protrude in the same direction from the coupling surfaces 41a. Also at this time, the plates 42 are curved toward an opposite side of the opening 41b of the coupling member 41.

In the heat exchanger 40, the two plates 42 are positioned to face each other with the two coupling members 41 therebetween. Description below focuses on the two plates 42 (a pair of plates 42). Each coupling member 41 couples the ends of the two plates 42 to each other. In other words, each coupling member 41 couples the ends of the heat exchange channels 42a of the two plates 42. The two plates 42 are positioned annularly. In addition, the two plates 42 are positioned so as to surround the collecting section 31 laterally. The two coupling members 41, as well as the two plates 42, are positioned in line symmetry.

N pairs of such two plates 42 are positioned so as to overlap with each other in the downward-flow direction. In other words, each pair of plates 42 are stacked in the downward-flow direction. There is a gap between the plates 42 in each layer and the plates 42 in the adjacent layer. In addition, the opening 41b of the coupling member 41 faces outside of a ring formed by the two facing plates 42. In other words, the opening 41b of the coupling member 41 is open laterally in the collecting section 31 extending in the downward-flow direction. At this time, the opening 41b is positioned laterally in the collecting section 31 with respect to the end of the heat exchange channel 42a of each plate 42. In other words, the end of the heat exchange channel 42a of each plate 42 is located inside the opening 41b (on the channel side of the cooling liquid 110).

A diameter of an outer circumference formed by the two plates 42 is equal to or smaller than a width of the columnar purification device 21 (in other words, a diameter of a circular cross section orthogonal to the downward-flow direction in the purification device 21). In other words, the diameter of the outer circumference of the ring formed by the two plates 42 included in each pair is equal to or smaller than the width of the purification device 21.

In addition, the opening 41b of the coupling member 41 is coupled to all the coupling ports of the respective coupling surfaces 41a via a channel inside the coupling member 41. Therefore, the opening 41b of each coupling member 41 is coupled to the heat exchange channels 42a of all the plates 42 coupled to the coupling member 41. In other words, the heat exchange channels 42a of the respective plates 42 are coupled to the common opening 41b.

The opening 41b of each coupling member 41 is coupled to a channel of the cooling liquid 110 leading to an engine or the like. The opening 41b of one of the coupling members 41 (hereinafter, an intake section) serves as an inlet of the cooling liquid 110 to the heat exchange channel 42a of each plate 42. In other words, the opening 41b serves as a common inlet to the heat exchange channel 42a of each plate 42. The opening 41b of the other coupling member 41 (hereinafter, a discharge section) is an outlet of the cooling liquid 110 from the heat exchange channel 42a of each plate 42. In other words, the opening 41b serves as a common outlet from the heat exchange channel 42a of each plate 42.

The cooling liquid 110 reaching the inlet flows into the intake section. The coupling surface 41a is located on both sides of the inlet. In each coupling surface 41a, the coupling ports are positioned at equal intervals. Therefore, it is possible to suppress disproportional introduction of the cooling liquid 110 into the heat exchange channels 42a of some of the plates 42. The cooling liquid 110, when passing through the heat exchange channel 42a of each plate 42, flows into the discharge section from the coupling ports of the discharge section. Thereafter, the cooling liquid 110 flows out from the outlet to the channel of the cooling liquid 110.

[Effect]

In the integrated exhaust heat recovery device 1 of the present embodiment, heat is exchanged between the exhaust gas 100 and the cooling liquid 110 by the plurality of plates 42 stacked in the downward-flow direction. The plurality of plates 42 are coupled to the two coupling members 41. Further, at one end of the heat exchange channel 42a of each plate 42, the cooling liquid 110 flows from the opening 41b (inlet) of one of the coupling members 41. The cooling liquid 110 passing through the other end of the heat exchange channel 42a flows out from the opening 41b (outlet) of the other coupling member 41. The inlet and the outlet of the cooling liquid 110 are open laterally in the downward-flow direction. Therefore, it is possible to suppress variations in the distance between the heat exchange channel 42a in the plate 42 of each layer and the inlet, and variations in the distance between the heat exchange channels 42a and the outlet. Therefore, the flow of the cooling liquid 110 in the plate 42 of each layer can be more uniform.

Further, according to the present embodiment, the exhaust heat recovery device, which exchanges heat between the exhaust gas 100 and the cooling liquid 110, and the exhaust gas purification device 21 are integrated. Therefore, it is possible to reduce the installation space of the exhaust heat recovery device and the like. Furthermore, the length of the integrated exhaust heat recovery device 1 in the downward-flow direction can be reduced, as compared to the configuration in which the inlet and the outlet of the cooling liquid 110 are open in the downward-flow direction. As a result, it becomes possible to more flexibly determine the installation position of the integrated exhaust heat recovery device 1.

Therefore, it is possible to facilitate positioning of the exhaust heat recovery device or the like while improving efficiency of heat exchange.

Furthermore, since the exhaust heat recovery device and the purification device 21 are integrated, these housings can be formed integrally. Therefore, the number of parts can be reduced.

In addition, as a result of reduction in the length of the integrated exhaust heat recovery device 1 in the downward-flow direction, the integrated exhaust heat recovery device 1 can be positioned on the upstream side of the exhaust gas channel. For this reason, it is possible to exchange heat with exhaust gas having a higher temperature. As a result, efficiency of heat exchange can be improved.

The cooling liquid is introduced to and discharged from the plurality of plates 42 of the heat exchanger 40 laterally in the downward-flow direction where the plurality of plates 42 are stacked. Therefore, the plurality of plates 42 can have the same structure.

In addition, the flow velocity and the course of the exhaust gas 100 that has passed through the purification device 21 become non-uniform. On the other hand, in the integrated exhaust heat recovery device 1 of the present embodiment, the channel of the exhaust gas 100 having passed through the purification device 21 is narrowed by the collecting section 31 and the tubular section 50. Therefore, the flow velocity of the exhaust gas 100 flowing down through the collecting section 31 and the like is increased. At this time, the flow velocity and the course of the exhaust gas 100 become more uniform. The exhaust gas 100 as such is caused to flow out laterally in the collecting section 31, and thereby guided to the heat exchange chamber 4. Therefore, it is possible to increase the flow velocity of the exhaust gas 100 flowing down the inflow channel 52 and the heat exchange chamber 4. As a result, temperature of the exhaust gas 100 in the heat exchange chamber 4 is maintained higher. Therefore, efficiency of heat exchange is improved.

Further, in the integrated exhaust heat recovery device 1 of the present embodiment, the course of the exhaust gas 100 flowing down the collecting section 31 and the tubular section 50 at a high speed is reversed and flows out to the inflow channel 52. Therefore, the flow velocity of the exhaust gas 100 flowing down the inflow channel 52 and the heat exchange chamber 4 is further increased. At this time, the exhaust gas 100 flows into the inflow channel 52 while spreading in the radial direction. Therefore, flowing of the exhaust gas 100 into the heat exchange chamber 4 in a state biased to a specific area can be suppressed. As a result, temperature of the exhaust gas 100 of the heat exchange chamber 4 is further maintained at a high temperature. Therefore, efficiency of heat exchange is further improved.

Further, the integrated exhaust heat recovery device 1 of this embodiment can open and close the outlet 55 of the tubular section 50 by the valve device 6. This enables switching of whether to exchange heat. Further, the intake port 52a which is an inlet of the inflow channel 52 to the heat exchange chamber 4 is provided laterally in the collecting section 31. Therefore, when the outlet 55 is opened, the exhaust gas 100 is less likely to flow into the heat exchange chamber 4. Therefore, more than necessary heat exchange can be avoided.

Further, the integrated exhaust heat recovery device 1 of the present embodiment, the plates 42 of the heat exchanger 40 are positioned so as to surround the collecting section 31 laterally. For this reason, it is possible to effectively utilize a lateral space of the collecting section 31. This enables compact housing of the heat exchanger 40 and the like. Therefore, it is possible to downsize the integrated exhaust heat recovery device 1.

Further, the diameter of the outer circumference formed by the two plates 42 is equal to or less than the width of the purification device 21. Therefore, it is possible to avoid protrusion of the shape of the shell member 7 in the width direction of the integrated exhaust heat recovery device 1.

Further, each of the stacked plates 42 of the heat exchanger 40 has the same structure. In each layer, the two plates 42 are positioned annularly so as to surround the collecting section 31 laterally. Moreover, the two plates 42 are positioned line symmetric. Therefore, the flow of the cooling liquid 110 in the two plates 42 of each layer can be further uniform. As a result, efficiency of heat exchange can be improved.

[Other Embodiments]

(1) The upstream exhaust pipe 2, the downstream exhaust pipe 3, the tubular section 50 of the partition member 5, the shell member 7 or the like, of the integrated exhaust heat recovery device 1 of the present embodiment have a cylindrical shape. However, the shape is not limited to this. These members may have a tubular shape other than cylindrical shape.

(2) In the integrated exhaust heat recovery device 1 of this embodiment, the channel of the exhaust gas 100 is narrowed at the collecting section 31 and the tubular section 50. Then, by reversing the course of the exhaust gas 100 at the outlet 55 of the tubular section 50, the exhaust gas 100 is guided to the heat exchange chamber 4.

However, the exhaust gas may be directed to the heat exchange chamber without narrowing the channel of the exhaust gas or reversing the course of the exhaust gas. For example, the exhaust gas may be guided to the heat exchange chamber by adjusting the course of the exhaust gas on the upstream side of the heat exchange chamber. Specifically, for example, the heat exchange chamber may be positioned adjacent to the downstream side of the positioning section 20 where the purification device 21 is located. Then, the exhaust gas which has passed through the positioning section 20 may directly flow into the heat exchange chamber. Further, for example, a valve device may be provided between the positioning section 20 and the heat exchange chamber. Then, the exhaust gas may be guided by the valve device to one of the channel leading to the heat exchange chamber and the channel leading to the outlet of the shell member 7 without entering the heat exchange chamber.

(3) In the present embodiment, the shape of the plate 42 of the heat exchanger 40 is a semicircular arc. However, the shape of the plate is not limited to this and can be a shape of a strip bent or curved in the width direction (e.g., L-shaped or U-shape). Even in this case, similarly to the present embodiment, the plates can be positioned so as to surround the collecting section 31 laterally by using the coupling members 41.

Also, as in the above (2), when the exhaust gas is guided to the heat exchange chamber without reversing the course of the exhaust gas, there is no need to position the plates so as to surround the collecting section 31 laterally. In this case, the shape of the plate is not limited to a strip, and may be various flat shapes such as circular or polygonal. In this case, it is preferable to adjust the position and the shape of the coupling port of the coupling member which couples the heat exchange channel of each plate, according to the shape, the installation position, or the like of the plate. Of course, even in this case, the opening of the coupling member is positioned so as to open laterally in the downward-flow direction which is the stacking direction of the plates. At this time, the opening is located laterally in the downward-flow direction with respect to the end of the heat exchange channel of each plate. In other words, the end of the heat exchange channel of each plate is located inside the opening (on the channel side of the cooling fluid).

[Correspondence between Claims]

Correspondence between terms used in the description of the embodiment and terms used in the description of the claims will be shown.

The downstream exhaust pipe 3, the partition member 5, the valve device 6, and the shell member 7 correspond to an example of an exhaust gas control unit. The heat exchange chamber 4 corresponds to an example of a heat exchange section.

The periphery of the outlet 55 of the tubular section 50, and the collecting section 31, correspond to an example of the reduced section. Further, the valve device 6 corresponds to an example of a guide section, the outlet 55 corresponds to an example of a guiding position, and the cooling liquid corresponds to an example of a fluid.

The invention claimed is:

1. An integrated exhaust heat recovery device positioned in an exhaust gas channel which is a channel for exhaust gas from an engine, comprising:
    an exhaust pipe extending in a downward-flow direction of the exhaust gas channel, the exhaust pipe comprising:
        an enlarged section in which a diameter of the exhaust pipe is enlarged, with a purification device positioned in the enlarged section, the purification device comprising (i) a catalyst serving to oxidize or reduce the exhaust gas, or (ii) a filter; and
        a reduced section positioned on a downstream side of the enlarged section, the reduced section having a smaller width than the enlarged section;
    a shell member laterally surrounding the reduced section; and
    a heat exchanger configured to transmit heat of the exhaust gas to a fluid, the heat exchanger being positioned inside the shell member in a heat exchange chamber arranged between the shell member and the reduced section;
    wherein an intake port is located at a downstream end of the reduced section of the exhaust pipe, the intake port being arranged to cause the exhaust gas that flows through the reduced section to reverse direction and to flow into the heat exchange chamber; and
    wherein the heat exchanger comprises:
        a plurality of plates that are flat sections positioned so as to overlap in the downward-flow direction and stacked with a gap between adjacent plates, the plurality of plates surrounding the reduced section laterally and having heat exchange channels within the plurality of plates containing a flow of the fluid therein;
        a first coupling member, having a fluid inlet opening and a first channel, that couples first ends of the heat exchange channels of the plurality of plates and causes the fluid to flow through the fluid inlet opening and the first channel into the heat exchange channels of the plurality of plates, wherein the fluid inlet opening opens laterally in the downward-flow direction of the exhaust gas channel; and
        a second coupling member, having a fluid outlet opening and a second channel, that couples second ends of the heat exchange channels of the plurality of plates and causes the fluid that flows through the heat exchange channels to exit through the second channel and the fluid outlet opening, wherein the fluid outlet opening opens laterally in the downward-flow direction of the exhaust channel.

2. The integrated exhaust heat recovery device according to claim 1, wherein:
    each plate of the plurality of plates has an arc shape and forms a pair with another plate of the plurality of plates; and
    each pair of plates forms a ring shape so as to laterally surround the reduced section.

3. The integrated exhaust heat recovery device according to claim 2, further comprising a valve device that opens and closes an outlet of the exhaust pipe that is positioned at an end on a downstream side of the reduced section,
    wherein the valve device closes the outlet while forming a gap between the valve device and the end on the downstream side of the reduced section, and thereby causes the exhaust gas that flows out through the outlet of the exhaust pipe to laterally exit the reduced section through the gap so as to introduce the exhaust gas to the heat exchanger.

4. The integrated exhaust heat recovery device according to claim 2, wherein:
    an outlet of the exhaust pipe is provided at an end on a downstream side of the reduced section;
    the integrated exhaust heat recovery device further comprises a tubular partition member laterally covering a portion of the reduced section including the end on the downstream side of the reduced section;
    the tubular partition member extends downstream beyond the outlet of the exhaust pipe while being spaced apart from the reduced section by a gap, and comprises a flange-like partition section at an end on an upstream side thereof; and
    the heat exchanger is disposed on the upstream side of the flange-like partition section.

5. The integrated exhaust heat recovery device according to claim 4, further comprising a valve device that opens and closes an outlet at an end on a downstream side of the tubular partition member;
    wherein the valve device, when closing the outlet of the tubular partition member, causes exhaust gas that flows out through the outlet of the exhaust pipe to flow through the gap between the tubular partition member and the reduced section so as to be introduced to the heat exchanger.

6. The integrated exhaust heat recovery device according to claim 5, wherein:
the exhaust pipe further comprises a coupling section disposed between the enlarged section and the reduced section, the coupling section tapering toward a downstream side thereof; and
the heat exchanger is disposed between the coupling section and the partition section.

7. The integrated exhaust heat recovery device according to claim 2,
wherein a diameter of the ring shape formed by each pair of plates is no larger than a width of the purification device.

8. The integrated exhaust heat recovery device according to claim 7, further comprising a valve device that opens and closes an outlet of the exhaust pipe that is positioned at an end on a downstream side of the reduced section;
wherein the valve device closes the outlet while forming a gap between the valve device and the end on the downstream side of the reduced section, and thereby causes the exhaust gas that flows out through the outlet of the exhaust pipe to laterally exit the reduced section through the gap so as to introduce the exhaust gas to the heat exchanger.

9. The integrated exhaust heat recovery device according to claim 7, wherein:
an outlet of the exhaust pipe is provided at an end on a downstream side of the reduced section;
the integrated exhaust heat recovery device further comprises a tubular partition member laterally covering a portion of the reduced section including the end on the downstream side of the reduced section;
the tubular partition member extends downstream beyond the outlet of the exhaust pipe while being spaced apart from the reduced section by a gap, and comprises a flange-like partition section at an end on an upstream side thereof; and
the heat exchanger is disposed on the upstream side of the flange-like partition section.

10. The integrated exhaust heat recovery device according to claim 9, further comprising a valve device that opens and closes an outlet at an end on a downstream side of the tubular partition member;
wherein the valve device, when closing the outlet of the tubular partition member, causes exhaust gas that flows out through the outlet of the exhaust pipe to flow through the gap between the tubular partition member and the reduced section so as to be introduced to the heat exchanger.

11. The integrated exhaust heat recovery device according to claim 10, wherein:
the exhaust pipe further comprises a coupling section disposed between the enlarged section and the reduced section, the coupling section tapering toward a downstream side thereof; and
the heat exchanger is disposed between the coupling section and the partition section.

12. The integrated exhaust heat recovery device according to claim 1, further comprising a valve device that opens and closes an outlet of the exhaust pipe that is positioned at an end on a downstream side of the reduced section;
wherein the valve device closes the outlet while forming a gap between the valve device and the end on the downstream side of the reduced section, and thereby causes the exhaust gas that flows out through the outlet of the exhaust pipe to laterally exit the reduced section through the gap so as to introduce the exhaust gas to the heat exchanger.

13. The integrated exhaust heat recovery device according to claim 1, wherein:
an outlet of the exhaust pipe is provided at an end on a downstream side of the reduced section;
the integrated exhaust heat recovery device further comprises a tubular partition member laterally covering a portion of the reduced section including the end on the downstream side of the reduced section;
the tubular partition member extends downstream beyond the outlet of the exhaust pipe while being spaced apart from the reduced section by a gap, and comprises a flange-like partition section at an end on an upstream side thereof; and
the heat exchanger is disposed on the upstream side of the flange-like partition section.

14. The integrated exhaust heat recovery device according to claim 13, further comprising a valve device that opens and closes an outlet at an end on a downstream side of the tubular partition member;
wherein the valve device, when closing the outlet of the tubular partition member, causes exhaust gas that flows out through the outlet of the exhaust pipe to flow through the gap between the tubular partition member and the reduced section so as to be introduced to the heat exchanger.

15. The integrated exhaust heat recovery device according to claim 14, wherein:
the exhaust pipe further comprises a coupling section disposed between the enlarged section and the reduced section, the coupling section tapering toward a downstream side thereof; and
the heat exchanger is disposed between the coupling section and the partition section.

* * * * *